United States Patent

[11] 3,585,363

| [72] | Inventor | David B. Price |
| | | Mansfield, Ohio |
| [21] | Appl. No. | 814,722 |
| [22] | Filed | Apr. 9, 1969 |
| [45] | Patented | June 15, 1971 |
| [73] | Assignee | Westinghouse Electric Corporation |
| | | Pittsburgh, Pa. |

[54] CONVENIENCE FOOD TOASTER OPERABLE AT DIFFERENT WATTAGE LEVELS
5 Claims, 5 Drawing Figs.

| [52] | U.S. Cl. | 219/494 |
| [51] | Int. Cl. | H05b 1/02 |
| [50] | Field of Search | 99/329, |
| | | 333; 219/492, 412, 413, 501, 240, 494 |

[56] References Cited
UNITED STATES PATENTS

| 3,180,999 | 4/1965 | Kuykendall | 219/501 |
| 3,247,358 | 4/1966 | Schmidt | 219/240 |
| 3,303,326 | 2/1967 | Holtkamp | 219/413 |
| 3,342,121 | 9/1967 | Pavelka, Jr. et al. | 99/329 |

Primary Examiner—Bernard A. Gilheany
Assistant Examiner—F. E. Bell
Attorneys—F. H. Henson, E. C. Arenz and B. B. Sklar ABSTRACT: Control for a toaster. The control is characterized by the incorporation of a selector switch for reducing the operating wattage of the toaster to stretch the cycle. The actuator of the selector switch, in one position thereof, serves to block movement of the "doneness" control to thereby recalibrate or change the effect the "doneness" control has on the timing device of the toaster.

PATENTED JUN 15 1971  3,585,363

INVENTOR
David B. Price
BY *[signature]*
AGENT 3,585,363

CONVENIENCE FOOD TOASTER OPERABLE AT DIFFERENT WATTAGE LEVELS

BACKGROUND OF THE INVENTION

This invention relates, in general, to toasters and, more particularly, to a control therefor.

The invention is incorporated in a popup-type of toaster, such toasters at one time being used solely for toasting bread. Recently, food manufacturers have been marketing foods, either frozen or nonfrozen, which can be accommodated by conventional popup toasters.

It is common in conventional automatic toasters such as these to have a "doneness" control which, in effect, changes the length of time of the toasting cycle to either increase or decrease the surface browning of the article being toasted; however, it has been found, especially in frozen foods, to adequately warm the inside of the article with such a toaster requires a cycle duration of such lengths that the surface becomes burnt.

One solution to the problem is the provision of a toaster which can be selectively operated at a normal toasting wattage or at a reduced wattage, for example one-half the normal wattage, thereby decreasing the heat generated and increasing the duration of the automatically timed cycle.

It is well known in cooking art that a relatively high temperature will surface brown bread or the like in a short time while leaving the interior mostly unchanged, whereas the food article can be cooked or browned throughout quite evenly if the article were subjected to a lower temperature over a longer period of time. This principle was utilized in the toaster art as exemplified in U.S. Pat. No. 2,285,156 providing a toaster which, in addition to operating at a normal toasting temperature, would operate at a lower temperature to prepare "Melba" toast. In this toaster the reduction in temperature was accomplished through a thermostatically controlled switch operative only when "Melba" was desired with the length of the cycle for either operation determined manually.

Another example of a toaster serving a purpose in addition to toasting is shown in U.S. Pat. No. 2,711,684 wherein a toaster is shown to include a grilling surface and a switch controlling which heater elements are operative during its separate functions. This toaster has an automatically timed cycle when operating as a toaster but not when functioning as a grill.

The present invention provides an automatic toaster, which can also be used to prepare convenience foods, having an automatically timed cycle for either mode of operation and which utilizes a reduced temperature heating cycle operative for a longer period of time to thoroughly thaw or cook the frozen and convenience foods. More specifically this invention provides an automatic toaster with an adjustable heat responsive "doneness" control and means for reducing the wattage of the toaster, and thereby the heat generated by the heaters, between a normal toasting level and a reduced convenience foods preparation level, with the "doneness" control automatically providing a longer cycle at the reduced wattage setting.

Accordingly, the general object of this invention is to provide a new and improved toaster.

It is a more particular object of this invention to provide a new and improved control for a popup-type toaster.

Another object of this invention is to provide a new and improved control for a toaster wherein the toaster can be selectively operated at different power levels depending on the type of food to be prepared.

Still another object of this invention is to provide, in a toaster, a "doneness" control which can be readily calibrated for operation of the toaster at full wattage or at reduced wattage.

BRIEF SUMMARY OF THE INVENTION

Briefly, the above-cited objects are accomplished by including in the circuit with the heater structure of a toaster, whose length of operation is automatically controlled by a heat responsive switch, a rectifier so that the heater structure can be operated at only half power. A normally closed switch, also in the circuit, serves in its closed position to bypass the rectifier to effect operation of the heater structure at full power. A knob slideably carried by the end panel of the toaster is operatively connected to the aforementioned switch. The knob has an extension which, in the open position of the switch, blocks movement of a "doneness" control, the effect of which is to prevent movement of the "doneness" control to the extreme when the toaster is operated at reduced wattage "dark" setting.

Further objects and advantages of the present invention will become apparent when considered in view of the description and drawings forming a part hereof.

DESCRIPTION OF THE PREFERRED EMBODIMENT

Figure 1:
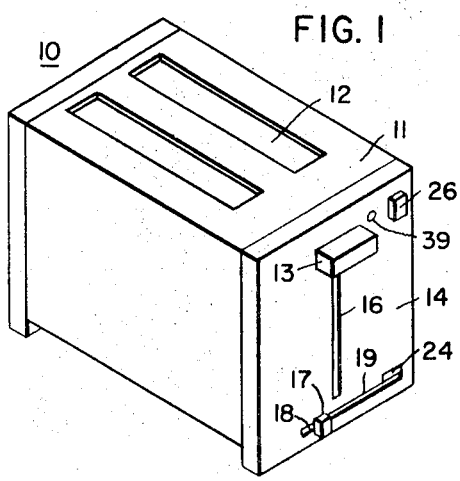
FIG. 1 is a perspective view of a toaster representing this invention.

Referring now to the drawings, especially Fig. 1, reference character 10 designates generally a toaster of the popup type (i.e. employing a carriage which is mechanically latched during the cycle of operation and which is spring biased to its nontoasting position). The toaster comprises a top wall 11 provided with a pair of slots 12, through which bread or the like is placed on a carriage (not shown). The carriage is movable to its toasting position by means of a knob 13 contiguous on end panel 14 of the toaster. A lever arm (not shown) extends from within the toaster through a vertically elongated slot 16.

Figure 5:
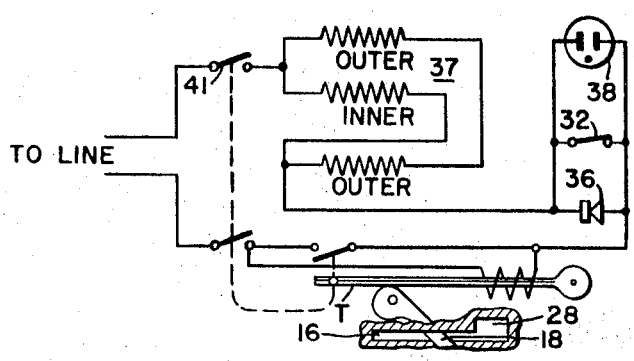
FIG. 5 is a diagram of the circuit incorporated in the toaster shown in Fig. 1, and schematically showing the automatic timer.

A "doneness" control knob 17 supported adjacent the lower end of the panel 14 is carried by a lever arm 18 which extends through a longitudinally extending slot 19. In a well-known manner, the lever arm 18 serves to vary the duration of the cycle of operation by changing the point at which the timer, schematically shown in Fig. 5, terminates the toasting operation. Such a control is shown and described in U.S. Pat. No. 3,342,121 issued to J. Pavelka, Jr. et al. and assigned to the Toastwell Company. This patent shows a timer control, also suitable, for incorporation in the present toaster, and as schematically illustrated in FIG. 5, generally includes a bimetal T adjacent a heater serially connected to the toaster heaters. Movement of the bimetal in response to its adjacent heater terminates the cycle with the "doneness" control providing an adjustment to determine the amount of movement required for such termination, all as described in the above-identified patent. It will be appreciated that, although the disclosed "doneness" control is of the slide lever type, a rotatable cam type as well as other constructions, would also be within contemplation of the present device. It is noted that the "doneness" control is strictly a positioning device which does not effect the wattage of the energized heater structure.

Figure 3:
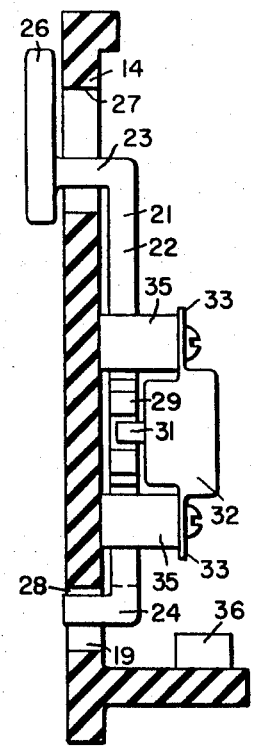
FIG. 3 is a cross-sectional view taken on the line III—III of Fig. 2.
Figure 4:
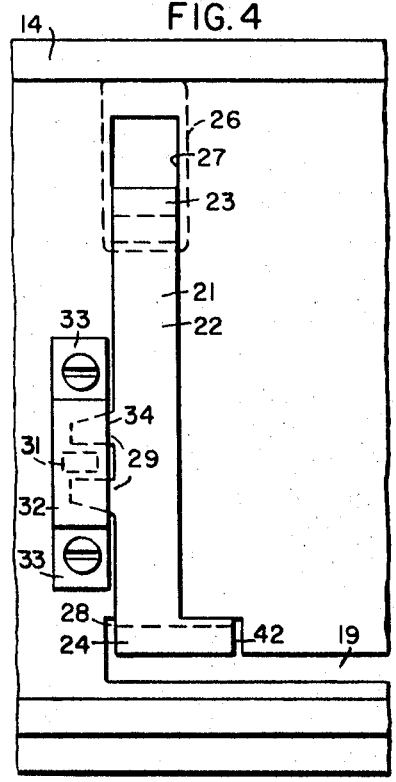
FIG. 4 is a rear view of Fig. 2.

A slide knob 21 (see particularly FIGS. 2, 3 and 4) comprises an elongated body portion 22 having transversely disposed ends 23 and 24. A knob manipulating portion 26 is attached to the end 23 which extends through a vertically disposed slot 27 in the end panel 14. The end 24 extends through an area 28 of the slot 19 and is movable between the top and bottom of the area 28 when the knob 21 is moved up and down. A bifurcated segment 29 of the body portion 22 has received therein a button 31 of a switch 32.

The switch 32 has a pair of flanges 33 which are used to mount the switch to a pair of spaced apart posts 35, which are molded integrally with the end panel 14. As can be seen from FIG. 4 the body portion 34 of the switch cooperates with the walls delineating the slot 27 to both captivate the knob 21 and guide the vertical movement thereof.

The switch 32, together with a rectifier 36 provides structure for applying full line voltage to heater structure 37 when the switch is closed, and half the voltage when the switch is open. A lamp 38 in parallel with the switch 32 serves as an indicator that the toaster is in its half-power mode of operation. The illumination from the lamp is visible through a lens 39 in the panel 14. A source of voltage is applied to the heater structure 37 through a line switch structure 41 which, in a well-known manner, is closed through downward movement of the knob 13.

OPERATION

To toast a nonfrozen article of food, for example, a piece of bread, the article is placed into the toaster through the slot 12 and lowered through depression of the knob 13. The "doneness" control knob 17 may be adjusted between "light and dark" settings prior to the foregoing, and in accordance with individual preference.

Figure 2:
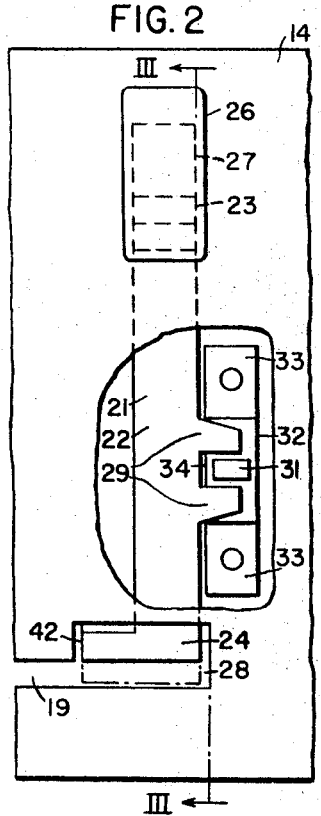
FIG. 2 is a fragmentary end view of the device illustrated in FIG. 1.

To toast a frozen article of food such as a waffle or pizza, the slide knob 26 is moved downwardly until the end 24, as shown in dotted lines in FIG. 2, occupies the lower portion of the area 28. The "doneness" control is then adjusted, again, in accordance with individual preference, between "light" and "medium" settings, access to the "dark" setting being prevented through engagement of the edge 42 of the end 24 with the lever arm 18. This blocked movement of the "doneness" control, prevents the "doneness" control from positioning the bimetal timer from its associated latch a greater distance than the heat generated at half wattage is capable of deflecting it to automatically terminate the cycle.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

What I claim is:

1. In an automatic toaster having a circuit including a heater means operatively connected to a source of power through a timing means to establish a heating cycle of operation, said timing means including a heat responsive means to initiate termination of said cycle upon reaching a predetermined heated condition, and means for varying the duration of the cycle over a predetermined range with said heater means energized at a relatively constant wattage level throughout said range and wherein the improvement comprises:

manually actuable switch means in said circuit movable between opened and closed positions;

and means operatively connected to said heater means by placing said switch means in one of said positions for reducing the wattage of said heater to a relatively constant predetermined lower level, said heater means operatively connected through said timing means when said switch means is in said reduced wattage position, whereby a greater length of time is required to heat said heat responsive means to said predetermined termination condition thus extending the cycle of operation of said toaster at reduced wattage.

2. Structure as specified in claim 1 wherein said means for reducing the wattage of said heater comprises a rectifier.

3. Structure according to claim 2 wherein said switch means and said rectifier are connected to said circuits in parallel and said one of said positions corresponds to said switch opened position.

4. Structure according to claim 3 including a manually movable actuator associated with said switch means, said actuator having an abutment surface movable from a noninterfering position to a position interfering with said duration varying means when said actuator is moved from said switch closed to said switch open position.

5. Structure according to claim 4 wherein said rectifier is a diode.

UNITED STATES PATENT AND TRADEMARK OFFICE
Certificate

Patent No. 3,585,363                                              Patented June 15, 1971

David B. Price

Application having been made by David B. Price, the inventor named in the patent above identified, and Westinghouse Electric Corporation, Pittsburgh, Pa., a corporation of Pennsylvania, the assignee, for the issuance of a certificate under the provisions of Title 35, Section 256, of the United States Code, adding the name of Wathena L. Shine as a joint inventor, and a showing and proof of facts satisfying the requirements of the said section having been submitted, it is this 23rd day of May 1978, certified that the name of the said Wathena L. Shine is hereby added to the said patent as a joint inventor with the said David B. Price.

FRED W. SHERLING,
*Associate Solicitor.*